(12) United States Patent
Hwang et al.

(10) Patent No.: US 11,670,990 B2
(45) Date of Patent: Jun. 6, 2023

(54) STATOR ASSEMBLY AND HAIRPIN WINDING MOTOR INCLUDING THE SAME

(71) Applicant: HYUNDAI MOBIS CO., LTD., Seoul (KR)

(72) Inventors: Seong Jun Hwang, Yongin-si (KR); Yeong Woo Seo, Yongin-si (KR); Hye Seong Yang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 190 days.

(21) Appl. No.: 17/248,609

(22) Filed: Jan. 29, 2021

(65) Prior Publication Data
US 2021/0257885 A1  Aug. 19, 2021

(30) Foreign Application Priority Data
Feb. 17, 2020  (KR) .......... 10-2020-0019211

(51) Int. Cl.
| | |
|---|---|
| *H02K 9/22* | (2006.01) |
| *F28D 15/02* | (2006.01) |
| *H02K 3/28* | (2006.01) |
| *H02K 9/20* | (2006.01) |
| *H02K 9/19* | (2006.01) |

(52) U.S. Cl.
CPC .......... *H02K 9/225* (2021.01); *F28D 15/0275* (2013.01); *H02K 3/28* (2013.01); *H02K 9/19* (2013.01); *H02K 9/20* (2013.01)

(58) Field of Classification Search
CPC ............ H02K 9/225; H02K 3/28; H02K 9/20; H02K 3/24; H02K 9/19; H02K 9/22; H02K 1/16; H02K 3/12; F28D 15/0275

USPC ....................................................... 310/54, 63
See application file for complete search history.

(56) References Cited

U.S. PATENT DOCUMENTS

| | | | | |
|---|---|---|---|---|
| 2004/0155539 A1* | 8/2004 | Potoradi | ................ | H02K 9/225 310/58 |
| 2007/0024132 A1* | 2/2007 | Salamah | ................ | F03D 80/60 290/55 |
| 2008/0023177 A1* | 1/2008 | Hassett | ................ | H02K 9/225 165/104.33 |

(Continued)

FOREIGN PATENT DOCUMENTS

KR  10-2019-0048745 A  5/2019

OTHER PUBLICATIONS

English translation of KR 20190093931. (Year: 2019).*
English translation of DE 102017211317 (Year: 2019).*
English translation of JP 202014283 (Year: 2020).*

*Primary Examiner* — Ahmed Elnakib
(74) *Attorney, Agent, or Firm* — Morgan, Lewis & Bockius LLP

(57) ABSTRACT

A stator assembly includes a stator core including teeth, which are formed along an inner circumferential surface of the stator core, extend from one surface of the stator core to an opposite surface of the stator core, and have through holes formed through one surfaces of the teeth, respectively, a plurality of hairpins, each hairpin coupled to and connected with a slot formed between the teeth facing each other and forming form a coil winding, and a heat radiating device including a first heat radiating member provided at one side of the one surface of the stator core to discharge heat of the hairpin to an outside, such that the hairpin is cooled.

14 Claims, 14 Drawing Sheets

(56) References Cited

U.S. PATENT DOCUMENTS

| | | | |
|---|---|---|---|
| 2015/0207386 A1* | 7/2015 | Garrard | H02K 9/19 |
| | | | 29/596 |
| 2018/0054097 A1* | 2/2018 | Dlala | H02K 15/024 |
| 2019/0238010 A1* | 8/2019 | Iki | H02K 1/20 |
| 2020/0227965 A1 | 7/2020 | Huber | H02K 3/24 |
| 2021/0257885 A1* | 8/2021 | Hwang | H02K 9/225 |

* cited by examiner

STATOR ASSEMBLY AND HAIRPIN WINDING MOTOR INCLUDING THE SAME

CROSS-REFERENCE TO RELATED APPLICATION

This application claims the benefit of priority to Korean Patent Application No. 10-2020-0019211, filed in the Korean Intellectual Property Office on Feb. 17, 2020, the entire contents of which are incorporated herein by reference.

TECHNICAL FIELD

The present disclosure relates to a stator assembly having improved cooling efficiency and a hairpin winding motor including the same.

BACKGROUND

In general, a motor is known as increasing a power in proportional to the number of turns wound around a stator core. In particular, there have been developed studies and researches on a scheme to increase the fill factor of coils wound around the stator core to improve the power of the motor without increasing the size of the motor.

As a part of the scheme described above, there has been studied on a scheme of winding an angular coil having a substantially rectangular sectional surface, instead of an annular coil having a circular sectional surface.

However, the angular coil relatively has a difficulty in a work of winding a coil as compared to the annular coil. To overcome the above problem, there was suggested a motor (hereinafter, referred to as a "hairpin winding motor") employing a scheme of forming a coil winding part by welding a hairpin, after inserting a plurality of hairpins, which is separated from each other, into a stator coil and coupling the hairpins to the stator coil, such that a coil is easily wound.

In the above hairpin winding motor, a hairpin having the substantially U shape is coupled to each slot of the stator core and then a welding work is performed between hairpins disposed at each layer, such that the hairpins are coupled to each other, thereby forming a coil winding of the stator core.

However, in the hairpin winding motor, a coil part positioned inside a slot may not be effectively cooled down and thus there may be a limitation in improving the power and the efficiency.

PRIOR ART

Patent Document (Patent document 1) Korean Unexamined Patent Publication. No. 10-2019-0048745

SUMMARY

The present disclosure has been made to solve the above-mentioned problems occurring in the prior art while advantages achieved by the prior art are maintained intact.

An aspect of the present disclosure provides a stator assembly, capable of effectively cooling a hairpin, which is provided in a slot, especially, to an inner portion of the hairpin by including a heat radiating device to improve power and efficiency, and a hairpin winding motor including the same.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a stator assembly may include a stator core including teeth, which are formed along an inner circumferential surface of the stator core, extend from one surface of the stator core to an opposite surface of the stator core, and have through holes formed through one surfaces of the teeth, respectively, a plurality of hairpins, each hairpin coupled to and connected with a slot formed between the teeth and forming form a coil winding, and a heat radiating device including a first heat radiating member provided at one side of the one surface of the stator core to discharge heat of the hairpin to an outside, such that the hairpin is cooled. The first heat radiating member may include a first heat pipe to discharge the heat of the hairpin, which is provided in the stator core, to the outside such that the hairpin is cooled, and provided at the one side of the one surface of the stator core, and a first fixing member to fix the first heat pipe to the stator core.

The first heat pipe may include a plurality of first heat parts inserted into the through holes of the teeth, which are formed at the one side of the one surface of the stator core, respectively, to absorb the heat of the hairpins coupled to the slots through the teeth, a first connection part provided at the one side of the one surface of the stator core to connect the plurality of first heat parts, which are inserted into the through holes, with each other and to absorb heat of the first heat parts, and a first discharge part provided at the first connection part to discharge heat of the first connection part to the outside.

The first heat part may be inserted into the through hole while extending from one surface of the through hole to an opposite surface of the through hole to simultaneously absorb the heat of the hairpin coupled to the slot from one side of the hairpin to an opposite side of the hairpin.

The first heat part may have an area smaller than an area of the through hole to form an oil inflow space which is formed between the first heat part and an inner wall surface of the through hole.

The first fixing member may include a first outer fixing part to fix the first connection part of the first heat pipe, and a first inner fixing part to fix the first heat part of the first heat pipe, and the first inner fixing part may be formed to correspond to the tooth formed in the stator core.

The first outer fixing part may include a first one-side fitting groove formed in one side of an opposite surface of the first outer fixing part such that the first connection part and the first heat part, which are positioned at the one side of the one surface of the stator core, are fixedly inserted into the first one-side fitting groove, and a first through hole formed in one side of one surface of the first outer fixing part such that the first discharge part passes through the first through hole.

The first fixing member may have a face-to-face close contact with the one surface of the stator core, when the first connection part and the first heat part, which are positioned at the one side of the one surface of the stator core, are fitted into the first one-side fitting groove.

The heat radiating device may further include a second heat radiating member provided at an opposite side of an opposite surface of the stator core to discharge the heat of the hairpin to the outside, such that the hairpin is cooled. The second heat radiating member may include a second heat pipe to discharge the heat of the hairpin, which is provided in the stator core, to the outside such that the hairpin is cooled, and provided at the opposite side of the opposite surface of the stator core, and a second fixing member to fix the second heat pipe to the stator core.

The second heat pipe may include a plurality of second heat parts inserted into through holes of teeth formed in the opposite side of the opposite surface of the stator core, respectively, to absorb the heat of the hairpins coupled to the slots through the teeth, a second connection part provided at the opposite side of the opposite surface of the stator core to connect the plurality of second heat parts, which are inserted into the through holes, with each other and to absorb heat of the second heat parts, and a second discharge part provided at the second connection part to discharge heat of the second connection part to the outside.

The second heat part may be inserted into the through hole while extending from the opposite surface of the through hole to the one surface of the through hole to simultaneously absorb the heat of the hairpin coupled to the slot from opposite surface of the hairpin to one surface of the hairpin.

The second heat part may have an area smaller than an area of the through hole to form an oil inflow space between the second heat part and an inner wall surface of the through hole.

The second fixing member may include a second outer fixing part to fix the second connection part of the second heat pipe, and a second inner fixing part to fix the second heat part of the second heat pipe, and the second inner fixing part may be formed to correspond to the tooth formed in the stator core.

The second outer fixing part of the second fixing member may include a second opposite-side fitting groove formed in an opposite side of one surface of the second outer fixing part, such that the second connection part and the second heat part, which are positioned at the opposite side of the opposite surface of the stator core, are fixedly inserted into the second opposite-side fitting groove, and a second through hole formed in an opposite surface of the second outer fixing part, such that the second discharge part passes through the second through hole.

A first opposite-side fitting groove may be formed in an opposite side of the opposite surface of the first outer fixing part of the first fixing member, such that an end portion of the second heat part passing through the through hole is fitted into and coupled to the first opposite-side fitting groove, and a second one-side fitting groove may be formed in one side of the one surface of the second outer fixing part of the second fixing member, such that an end portion of the first heat part passing through the through hole is fitted into and coupled to the second one-side fitting groove.

Meanwhile, according to another aspect of the present disclosure, a hairpin winding motor may include a stator assembly, a rotor inserted into the stator assembly, a housing to receive the stator assembly into which the rotor is inserted, and a spraying device including a spraying part to cool the stator assembly by spraying oil toward the first heat radiating member included in the heat radiating device of the stator assembly, and a supply part to recover oil deposited on a bottom surface of the housing and to supply the oil to the spraying part. The spraying device may cool the stator assembly while simultaneously cooling the hairpin, which is coupled to the slot, from one side of the hairpin to an opposite side of the hairpin, as the oil flows from one surface of the through hole to an opposite surface of the through hole along the first heat part or the second heat part.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
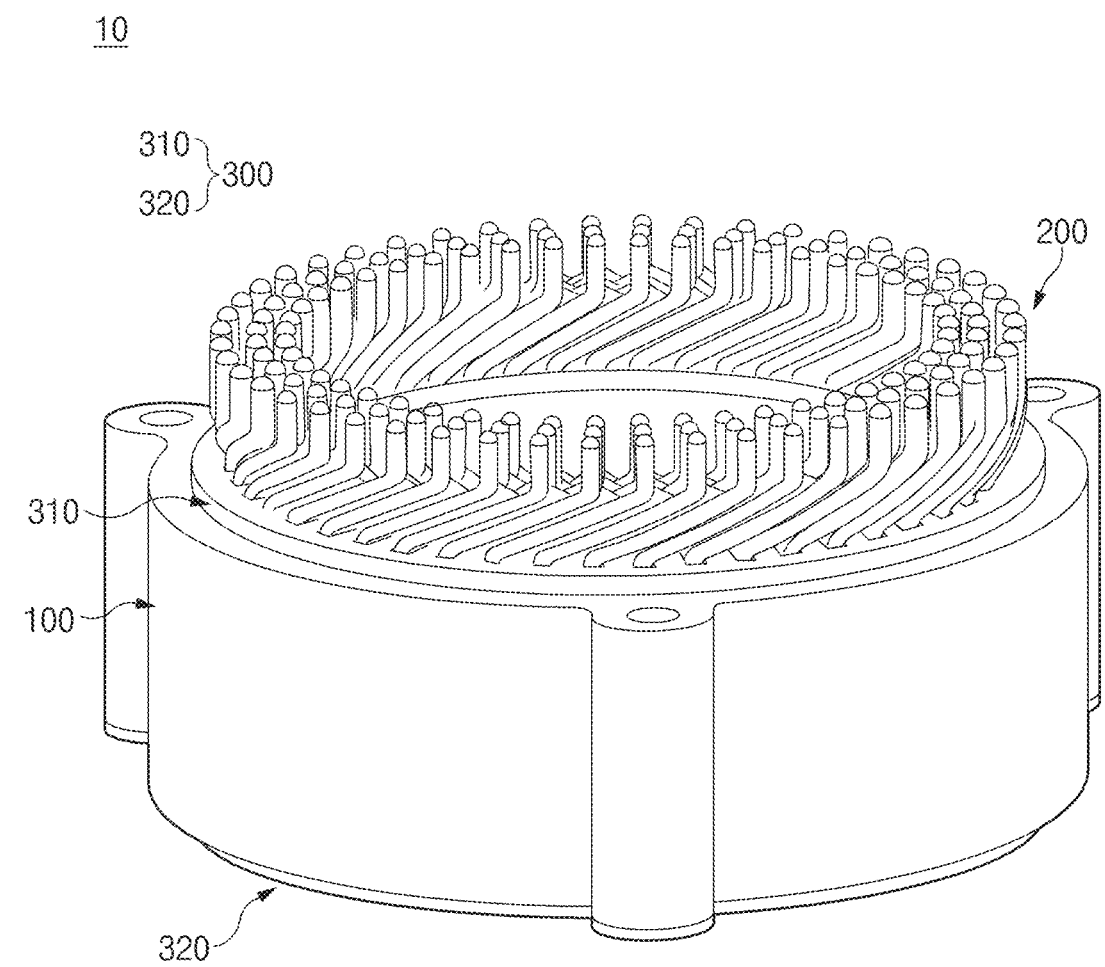
FIG. 1 is a perspective view illustrating a stator assembly, according to a first embodiment of the present disclosure.
Figure 2:
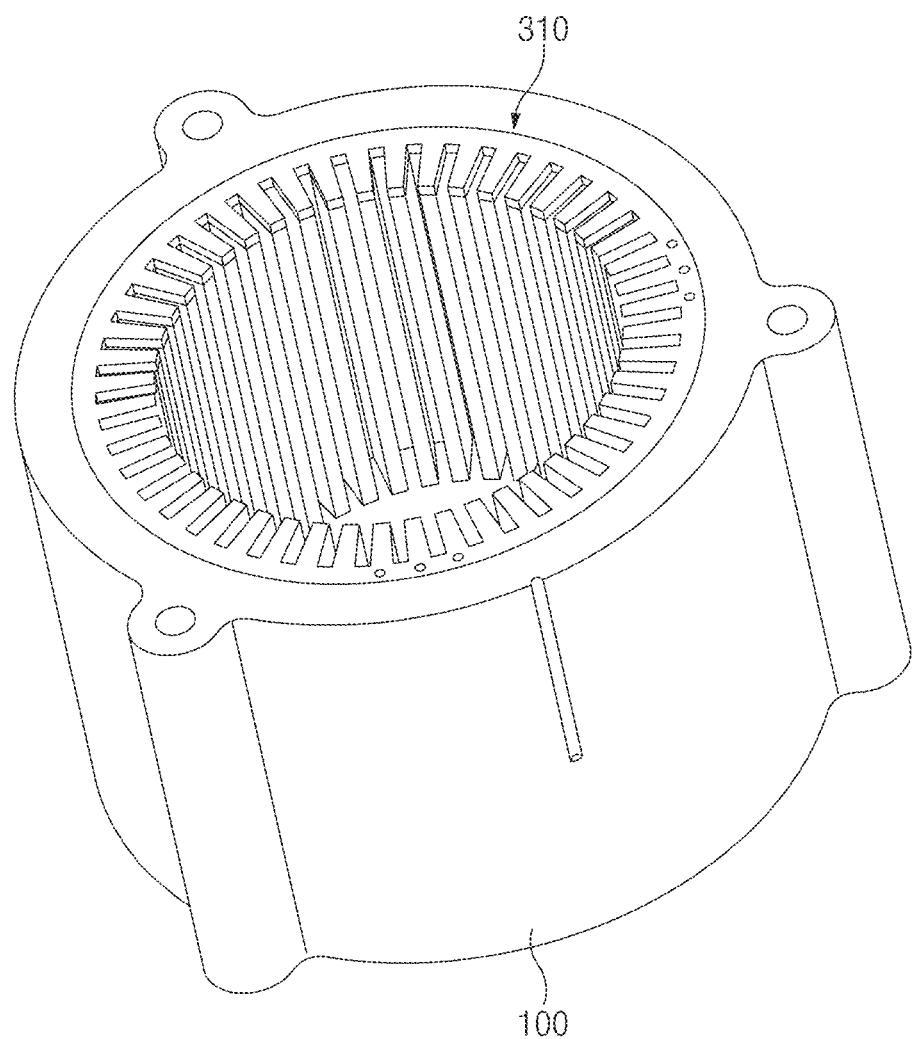
FIG. 2 is a perspective view illustrating a coupling state of a stator core and a first heat radiating member of a stator assembly, according to the first embodiment of the present disclosure.
Figure 3:
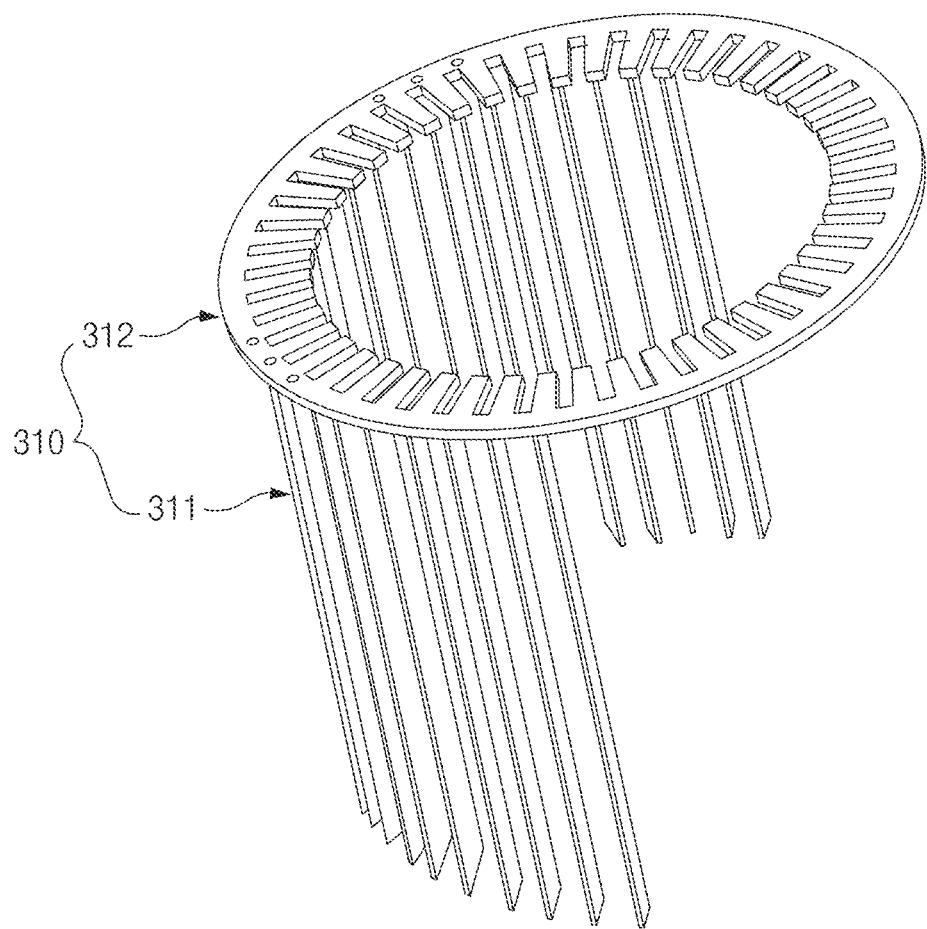
FIG. 3 is a perspective view illustrating a heat radiating device of a stator assembly, according to the first embodiment of the present disclosure.
Figure 4:
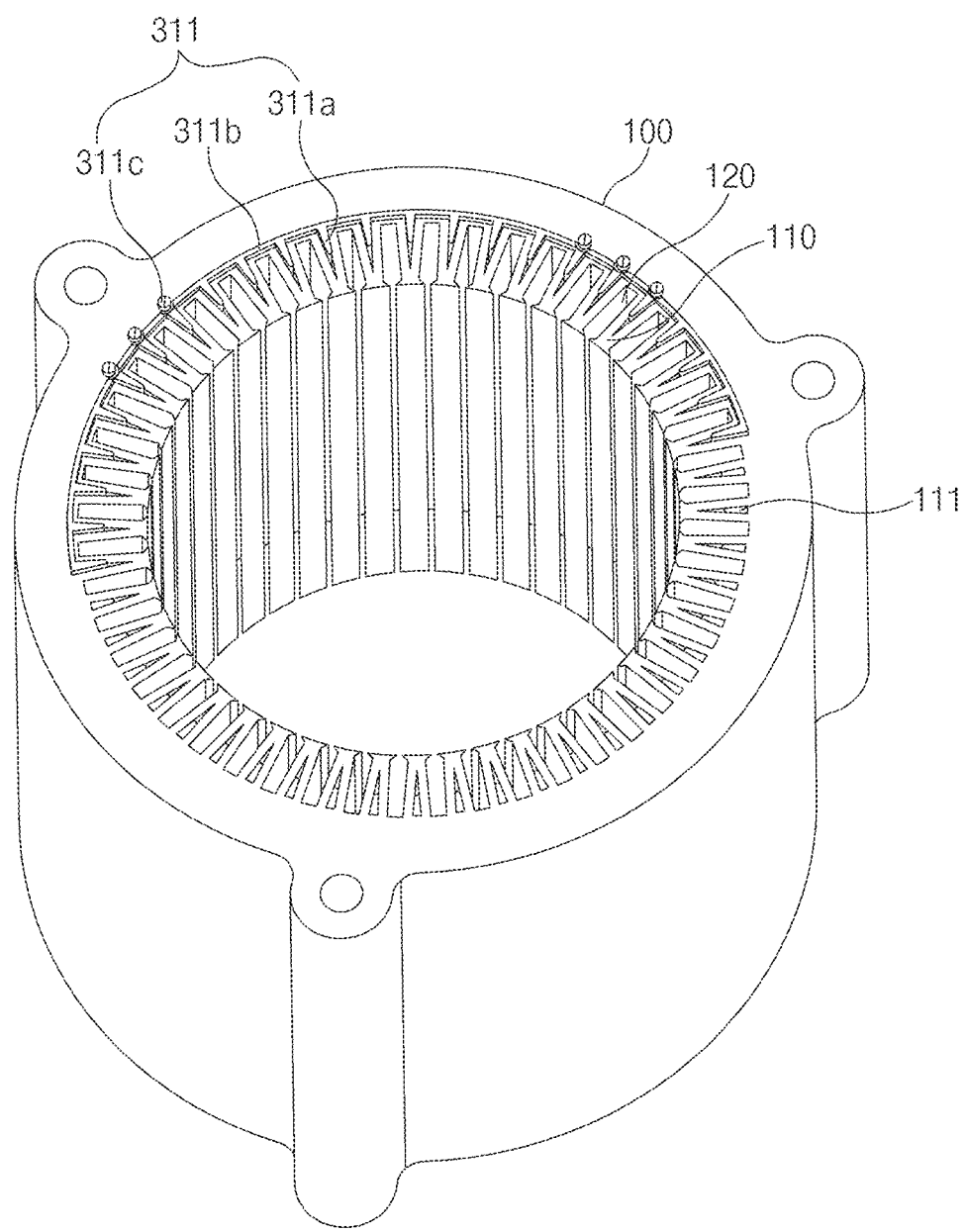
FIG. 4 is a perspective view illustrating a coupling state of a first heat radiating member of a stator assembly, according to the first embodiment of the present disclosure.
Figure 5:
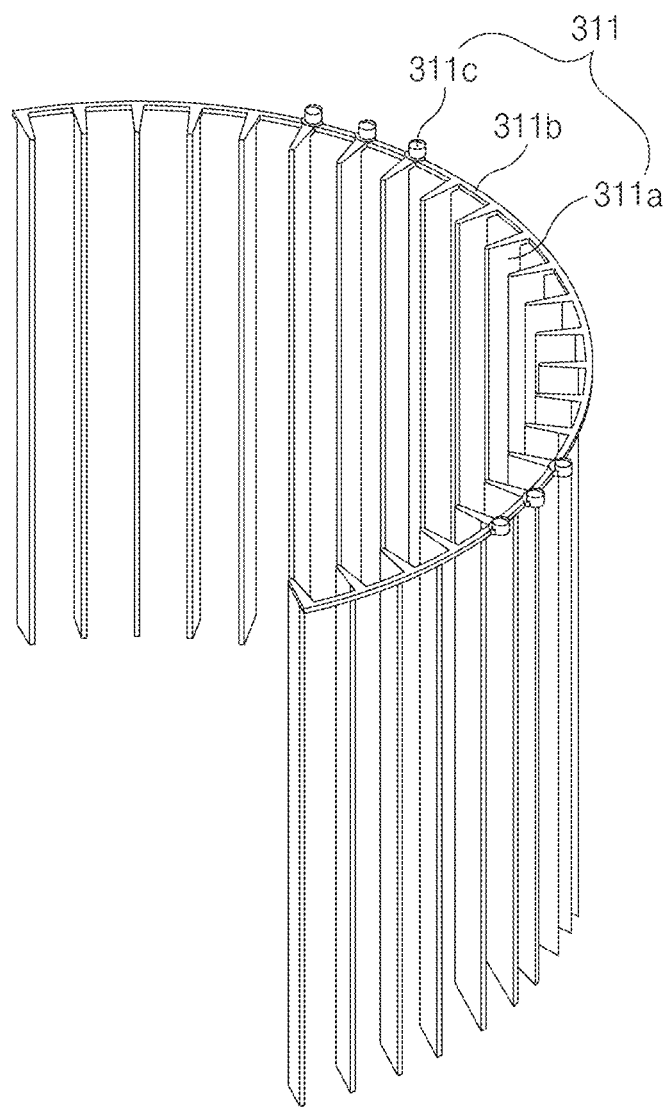
FIG. 5 is a perspective view illustrating a first heat pipe of a first heat radiating member.
Figure 6:
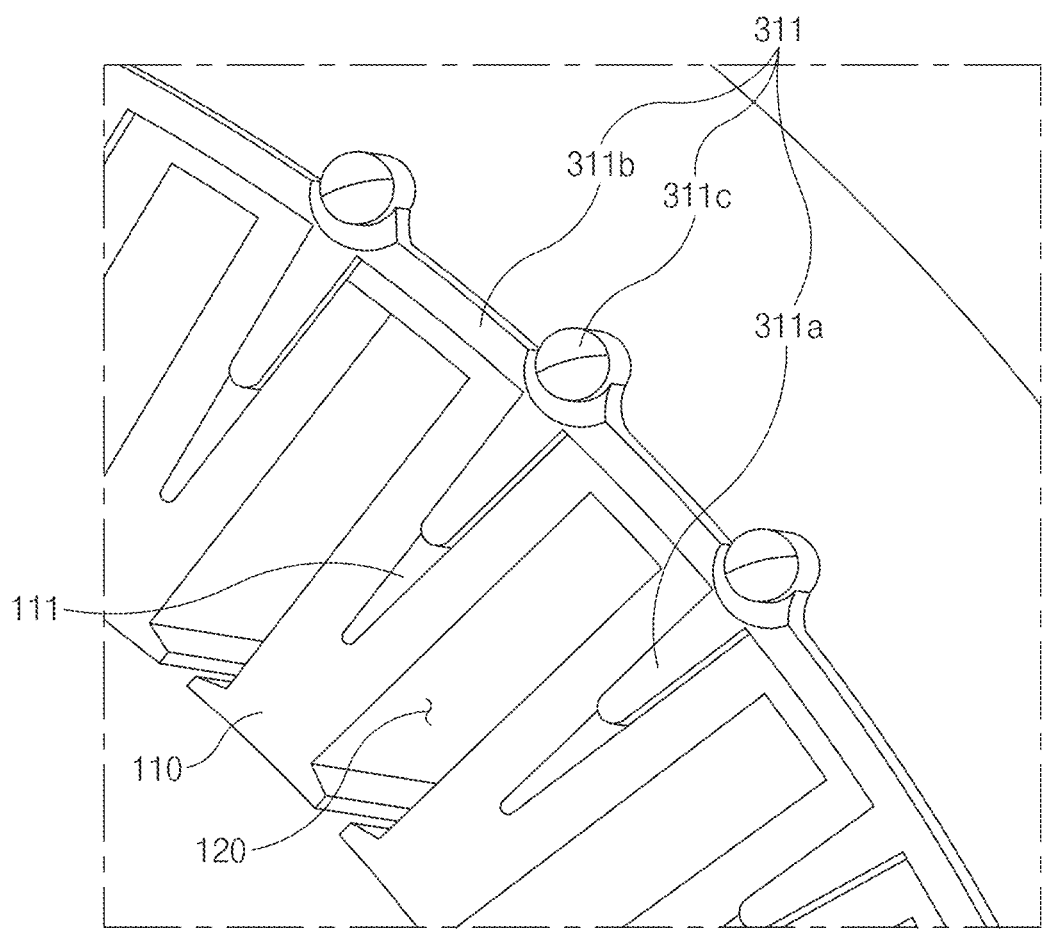
FIG. 6 is a partial enlarged view of a first heat radiating member of a stator assembly, according to the first embodiment of the present disclosure.
Figure 7:
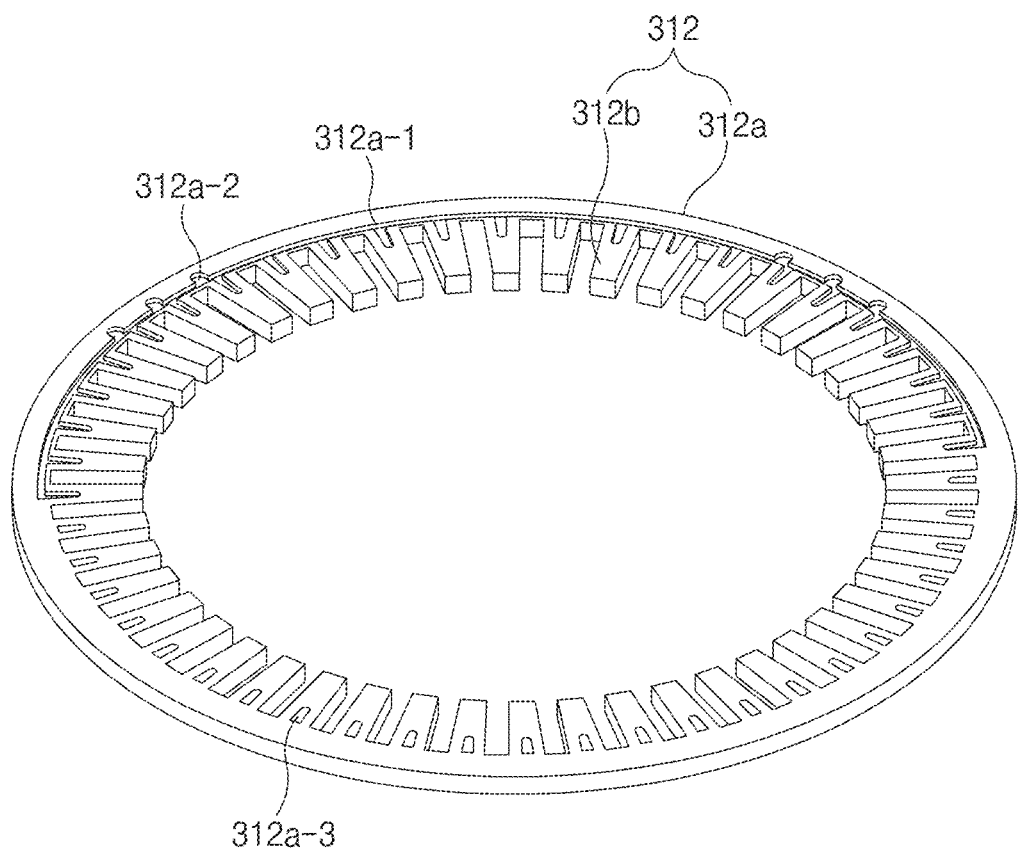
FIG. 7 is a bottom perspective view illustrating a first fixing member of a stator assembly, according to a first embodiment of the present disclosure.
Figure 8:
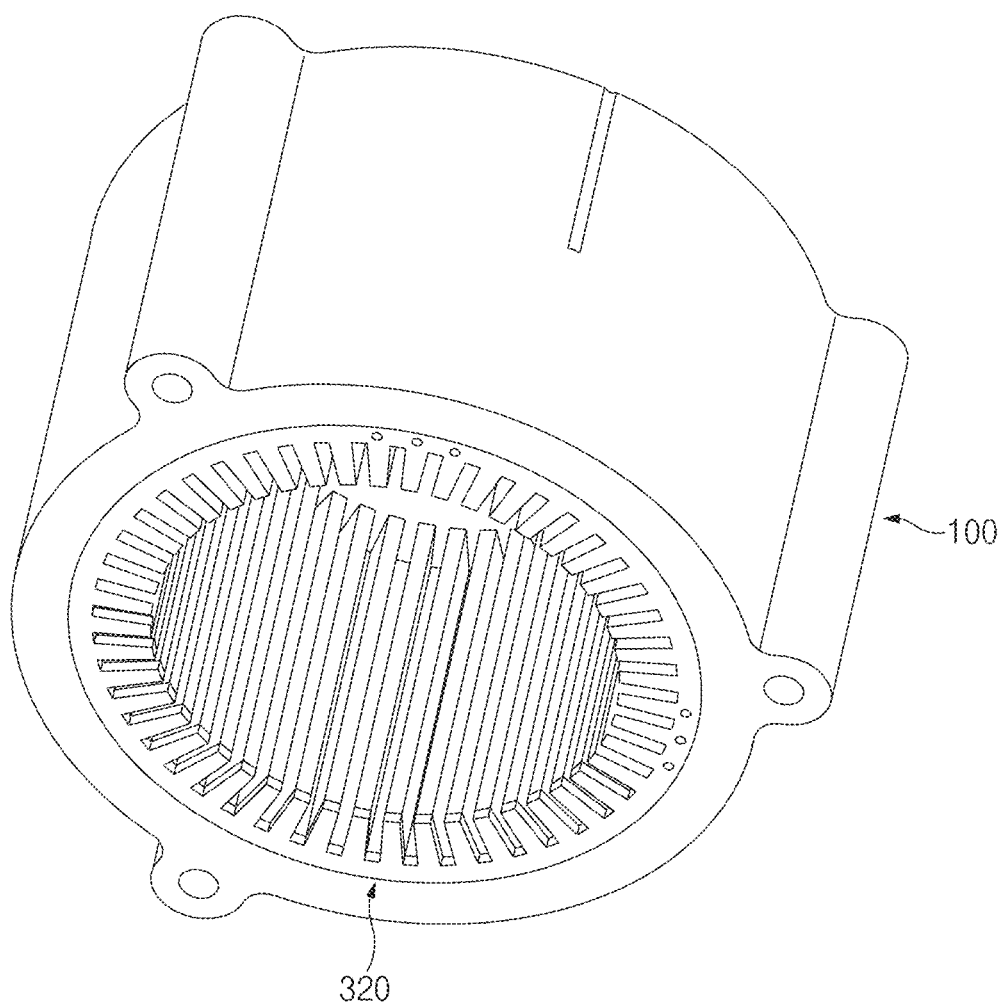
FIG. 8 is a perspective view illustrating a coupling state of a stator core and a second heat radiating member of the stator assembly, according to the first embodiment of the present disclosure.
Figure 9:
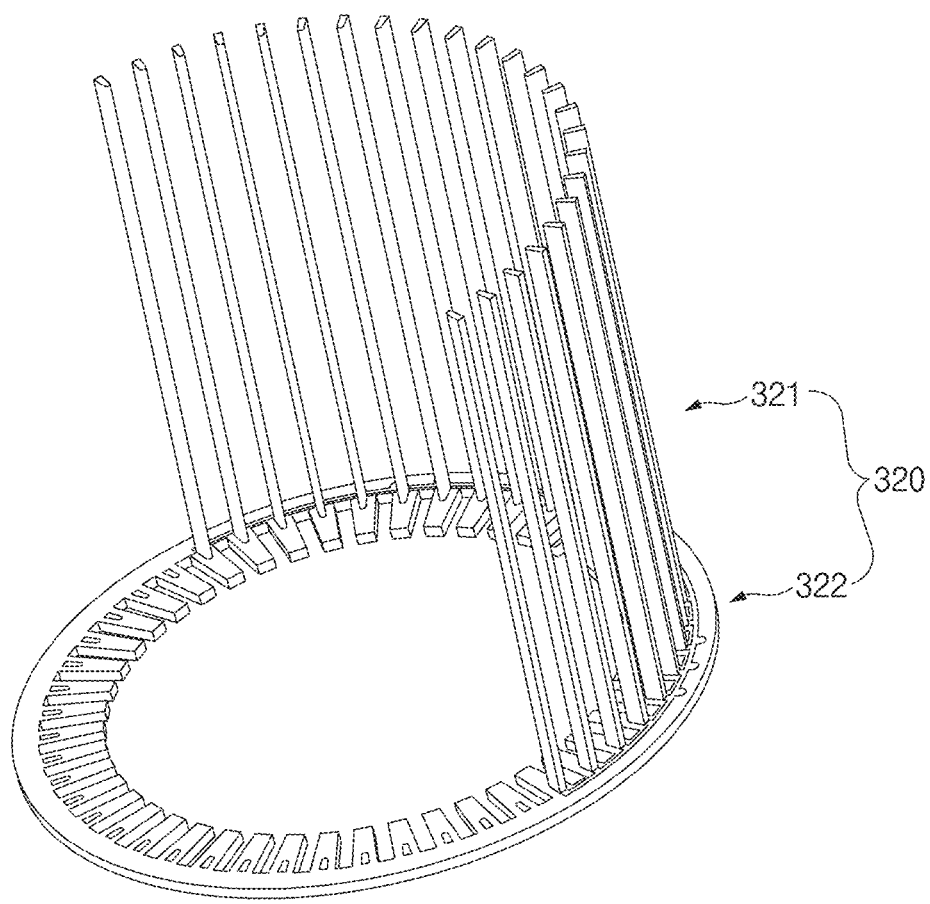
FIG. 9 is a perspective view illustrating a second heat radiating member of a stator assembly, according to a first embodiment of the present disclosure.
Figure 10:
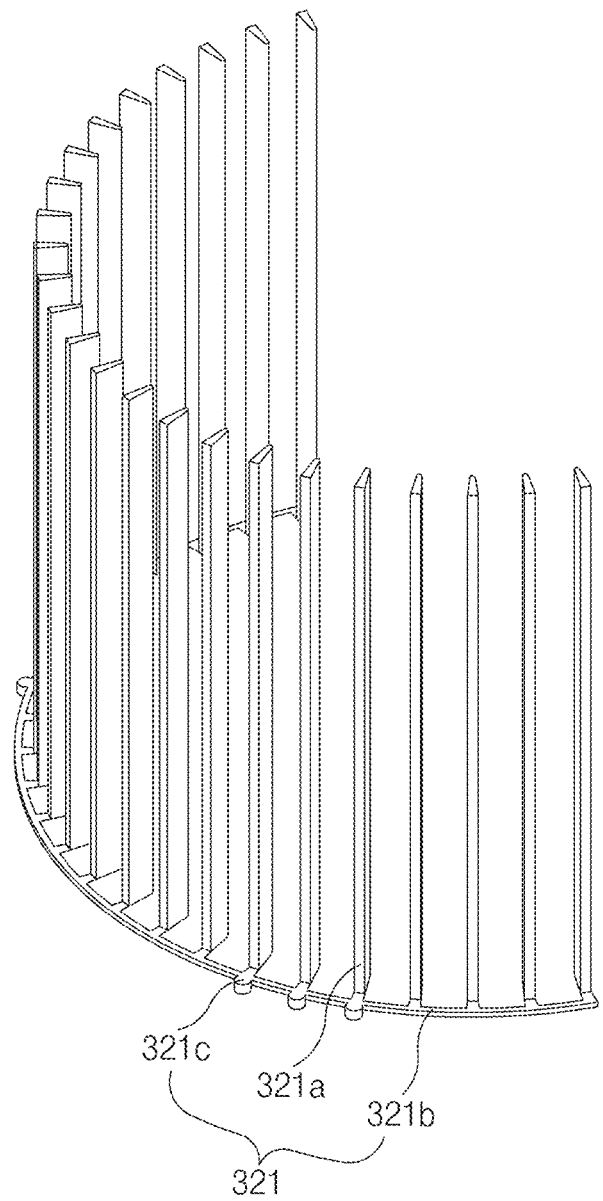
FIG. 10 is a perspective view illustrating a second heat pipe of a second heat radiating member.
Figure 11:
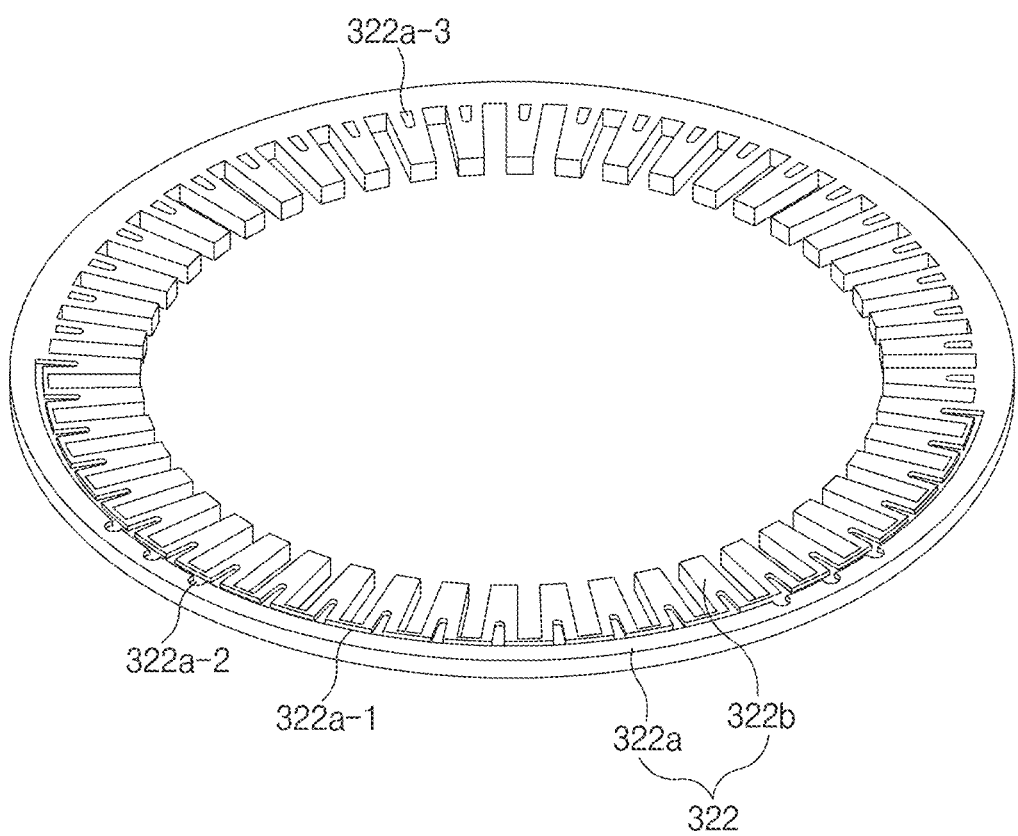
FIG. 11 is a bottom perspective view illustrating a second fixing member of a stator assembly, according to a first embodiment of the present disclosure.

Hereinafter, the embodiment of the present disclosure will be described in detail with reference to accompanying drawings to allow those skilled in the art to easily reproduce the present disclosure. However, the present disclosure may be implemented in various forms, and is limited to embodiments described herein. In addition, to clearly describe the present disclosure, part, which is irrelevant to the description, is omitted and similar reference numerals will be assigned to similar parts through the whole specification.

[Stator Assembly According to First Embodiment of Present Disclosure]

According to a first embodiment of the present disclosure, a stator assembly 10 includes a stator core 100, which includes teeth formed along an inner circumferential surface thereof and extends from one surface to an opposite surface thereof, each tooth having a through hole formed through one surface thereof, a plurality of hairpin 200, each hairpin being coupled to and making contact with a slot formed between opposite teeth and forming a coil winding, and a heat radiating device 300 to cool the hairpin 200 by discharging heat of the hairpin 200, which is provided in the stator core 100, to the outside, as illustrated in FIGS. 1 to 11.

Stator Core

The stator core 100 has a cylindrical shape, and has teeth 110 formed along the inner circumferential surface of the stator core 100 while being spaced apart from each other, and the tooth 110 extends between opposite surfaces of the stator core 100. In addition, the slot 120 is formed between the opposite teeth 110 to be coupled to the hairpin 200.

Meanwhile, as the tooth 110 may have a trapezoidal shape having a width narrowed toward the center of the stator core 100, the slot 120 formed between the teeth 110 may have the shape of a rectangle such that the hairpin 200 having an angular coil is inserted into the slot 120.

In addition, a through hole 111 is formed through one surface of the tooth 110, while extending from one surface of the tooth 110 to an opposite surface of the tooth 110.

In particular, the through hole 111 is formed in the shape of a triangle to transmit a uniform magnetic flux. In other words, as the through hole 111 is formed in the center of the tooth 110 in the shape of a triangle, opposite side portions of the tooth 110 have equal widths. Accordingly, the magnetic flux may be identically transmitted to the opposite side portions of the tooth 110.

Hairpin

The hairpin 200 forms a coil winding, as the hairpin 200 is coupled to and connected with the slot 120 formed between the teeth 110 facing each other. In other words, the hairpin 200 is formed in a U shape or a V shape, and leg parts formed at opposite side portions of the hairpin 200 are inserted into and coupled to relevant slots 120.

In this case, the opposite leg parts of the hairpin 200 are coupled to specific slots while being spaced apart from each other by a specific distance. For example, when one leg part of the hairpin 200 is coupled to a first slot, another leg part of the hairpin 200 is coupled to a seventh slot spaced by six slots apart from the first slot.

Heat Radiating Device

The heat radiating device 300, which is to cool the hairpin 200, includes a first heat radiating member 310 to discharge heat of the hairpin 200, which is provided at one side of the stator core 100, to the outside such that the hairpin 200 is cooled, and a second heat radiating member 320 to discharge heat of the hairpin 200, which is provided at an opposite side of the stator core 100, to the outside such that the hairpin 200 is cooled.

In other words, the heat radiating device 300 may cool half of the hairpin 200, which is provided in the stator core 100, through the first heat radiating member 310 and cool half of the hairpin 200, which is provided in the stator core 100, through the second heat radiating member 320, thereby efficiently cooling the entire portion of the hairpin 200 provided in the stator core 100. In particular, the first heat radiating member 310 and the second heat radiating member 320 are provided with an overturned relation while being symmetrical to each other. Accordingly, the first heat radiating member 310 and the second heat radiating member 320 may be easily coupled to the stator core 100. In other words, the first heat radiating member 310 may be coupled to one side of the stator core 100 and the second heat radiating member 320 may be coupled to an opposite side of the stator core 100 such that the efficiency of the coupling is improved.

Hereinafter, the heat radiating device will be described in more detail.

The first heat radiating member 310 includes a first heat pipe 311, which discharges heat of the hairpin 200, which is provided in the stator core 100, to the outside, such that the hairpin 200 is cooled and is provided at one side of one surface of the stator core 100, and a first fixing member 312 which fixes the first heat pipe 311 to the stator core 100.

The first heat pipe 311, which is to cool the hairpin 200 coupled to one side of the stator core 100, includes a plurality of heat parts 311a inserted into the through holes 111 of the teeth 110 formed at one side of one surface of the stator core 100 to absorb heat of the hairpin 200 coupled to the slots 120 through the teeth 110, a first connection part 311b provided at the one side of the one surface of the stator core 100 to connect the plurality of first heat parts 311a, which are inserted into the through holes 111, with each other, and absorbing heat of the first heat parts 311a, and at least one discharge part 311c provided at the first connection part 311b to discharge heat of the first connection part 311b to the outside.

In other words, the first heat pipe 311 may prevent the temperature of the hairpin 200 from being increased, that is, may cool the hairpin 200, as the heat of the hairpin 200 coupled to the slot 120 is absorbed by the plurality of first heat parts 311a inserted into the through holes 111 of the teeth 110 and then is discharged to the outside through the first connection part 311b and the first discharge part 311c.

Meanwhile, the first heat part 311a may be formed of an aluminum or copper material having a heat radiation property, and may have the shape of a rectangular sectional surface to increase a heat absorption rate. In particular, the first heat part 311a is inserted into the through hole 111 while extending from one surface of the through hole 111 to an opposite surface of the through hole 111. Accordingly, the first heat parts 311a may simultaneously absorb the heat of the hairpin 200 from one side to an opposite side of the hairpin 200 coupled to the slots 120, such that the entire portion of the hairpin 200 is uniformly cooled. In other words, the first heat part 311a may effectively cool the hairpin 200 to an inner portion of the hairpin 200 positioned at an inner side of the slot 120.

Meanwhile, a bottom surface of the first connection part 311b may have the form of a flat surface such that the bottom surface has a face-to-face close contact with one surface of the stator core 100. Accordingly, the adhesion between the first connection part 311b and the stator core 100 may be increased, thereby preventing noise from occurring, as the first connection part 311b vibrates or fluctuates, when the winding motor is operated.

Meanwhile, as the first heat part 311a has an area smaller than that of the through hole 111, an oil inflow space is formed between the first heat part 311a and an inner wall surface of the through hole 111. In other words, according to the present disclosure, oil is sprayed onto the stator core 100 to significantly increase the cooling efficiency of the hairpin 200. In this case, the oil sprayed onto the stator core 100 may cool the first heat part 311a and the hairpin 200 from one side to an opposite side of the first heat part 311a and the hairpin 200 while flowing down to the opposite side of the through hole 111 along the first heat part 311a. In other words, the oil sprayed onto the stator core 100 may efficiently cool the hairpin 200 positioned at the inside of the stator core 100 while passing through the oil inflow space along the first heat part 311a.

As described above, the first heat pipe 311 may efficiently cool the hairpin 200 coupled to one side of the stator core 100 from an outer portion (exposed to the outside) to an inner portion (not exposed to the outside) of the hairpin 200.

The first fixing member 312, which is to fix the first heat pipe, includes a first outer fixing part 312a to fix the first connection part 311b while being coupled to the one surface of the stator core 100 in the state that of pressing the first connection part 311b of the first heat pipe 311 provided at one side of the one surface of the stator core 100, and a first inner fixing part 312b to fix the first heat part 311a of the first heat pipe 311 by pressing one side of the one surface of the stator core 100.

In this case, the first inner fixing part 312b has the shape corresponding to that of the tooth 110 formed in the stator core 100 such that the hairpin 200 is inserted into the slot 120 of the stator core 100. In other words, the first inner fixing part 312b and the stator core 100 have slots facing each other.

Meanwhile, the first outer fixing part 312a is formed in one side of an opposite surface thereof with a first one-side fitting groove 312a-1 such that the first connection part 311b and the first heat part 311a positioned at one side of one surface of the stator core 100 are fixedly inserted into the first one-side fitting groove 312a-1. In other words, the first outer fixing part 312a is formed in one side of the opposite surface thereof with the first one-side fitting groove 312a-1 having the same shape as that of the first heat pipe 311. Accordingly, the first heat pipe 311 is inserted into the through hole 111 in the state that the first heat pipe 311 is coupled to the first fixing member 312, such that the first heat pipe 311 is more simply coupled.

In particular, when the first connection part 311b, which is positioned at one side of the one surface of the stator core 100, and the first heat part 311a are fitted into the first one-side fitting groove 312a-1, the fixing member 312 has a face-to-face close contact with one surface of the stator core 100, thereby preventing a foreign matter from being introduced between the first fixing member 312 and the stator core 100.

Meanwhile, the first outer fixing part 312a is formed in one side of one surface thereof with a first through hole 312a-2, such that the first discharge part 311c passes through the first through hole 312a-2, thereby rapidly discharging heat of the first heat pipe 311 to the outside.

As described above, the first fixing member 312 may stably fix the first heat pipe 311 coupled to the one surface of the stator core 100.

The second heat radiating member 320 includes a second heat pipe 321, which discharges heat of the hairpin 200, which is provided in the stator core 100, to the outside, such that the hairpin 200 is cooled and is provided at an opposite side of an opposite surface of the stator core 100, and a second fixing member 322 which fixes the second heat pipe 321 to the stator core 100.

The second heat pipe 321, which is to cool the hairpin 200 coupled to the opposite side of the stator core 100, includes a plurality of heat parts 321a inserted into the through holes 111 of the teeth 110 formed at the opposite side of the opposite surface of the stator core 100 to absorb heat of the hairpin 200 coupled to the slot 120 through the teeth 110, a second connection part 321b provided at the opposite side of the opposite surface of the stator core 100 to connect the plurality of second heat parts 321a, which are inserted into the through holes 111, with each other, and absorbing the heat of the second heat parts 321a, and at least one second discharge part 321c provided at the second connection part 321b to discharge the heat of the second connection part 321b to the outside.

In other words, the second heat pipe 321 may prevent the temperature of the hairpin 200 from being increased, that is, may cool the hairpin 200, as the heat of the hairpin 200 coupled to the slot 120 is absorbed by the plurality of second heat parts 321a inserted into the through holes 111 of the teeth 110 and then is discharged to the outside through the second connection part 321b and the second discharge part 321c.

Meanwhile, the second heat pipe 321 is formed of a material the same as that of the first heat pipe 311. In other words, the second heat pipe 321 may be formed of an aluminum or copper material having a heat radiation property, and may have the shape of a rectangular sectional surface to increase a heat absorption rate.

In particular, the second heat part 321a is inserted into the through hole 111 while extending to one surface of the through hole 111 from an opposite surface of the through hole 111. Accordingly, the second heat part 321a may simultaneously absorb the heat of the hairpin 200 to one side from an opposite side of the hairpin 200 coupled to the slot 120, such that the entire portion of the hairpin 200 is uniformly cooled.

Meanwhile, an opposite surface of the second connection part 321b may have the form of a flat surface to have a face-to-face close contact with the opposite surface of the stator core 100. Accordingly, the adhesion between the second connection part 321b and the stator core 100 may be increased, thereby preventing noise from occurring, as the second connection part 321b when the winding motor is operated.

Meanwhile, the second heat pipe 321a is formed of a material the same as that of the first heat pipe 311a. Meanwhile, as the second heat part 321a has an area smaller than that of the through hole 111, an oil inflow space is formed between the second heat part 321a and the inner wall surface of the through hole 111. In other words, according to the present disclosure, oil is sprayed onto the stator core 100 to significantly increase the cooling efficiency of the hairpin 200. In this case, the oil sprayed onto the stator core 100 may cool the second heat part 321a and the hairpin 200 from one side to an opposite side of the second heat part 321a and the hairpin 200 while flowing down to the opposite side of the through hole 111 along the second heat part 311a. In other words, the oil sprayed onto the stator core 100 may efficiently cool the hairpin 200 to a part, which is positioned at the center of the stator core 100, of the hairpin 200 while passing through the oil inflow space along the second heat part 321a.

As described above, the second heat pipe 321 may efficiently cool the hairpin 200 coupled to one side of the stator core 100 from an outer portion to an inner portion of the hairpin 200.

The second fixing member 322, which is to fix the second heat pipe 321, includes a second outer fixing part 322a provided at the second connection part 321b of the second heat pipe 321 provided at the opposite side of the opposite surface of the stator core 100 and coupled to the opposite surface of the stator core 100 to fix the second connection part 321b, and a second inner fixing part 322b provided inside the second outer fixing part 322a to fix the second heat part 321a of the second heat pipe 321 provided at the opposite side of the opposite surface of the stator core 100.

In this case, the second inner fixing part 322b has the shape corresponding to that of the tooth 110 formed in the stator core 100 such that the hairpin 200 is inserted into the slot 120 of the stator core 100. In other words, the second inner fixing part 322b and the stator core 100 have slots corresponding to each other.

Meanwhile, the second outer fixing part 322a is formed in an opposite side of the one surface thereof with a second opposite-side fitting groove 322a-1, such that the second connection part 321b and the second heat part 321a, which are positioned at the opposite of the opposite surface of the stator core 100, are fixedly inserted into the second opposite-side fitting groove 322a-1. In other words, the second outer fixing part 322a is formed in the opposite side of the one surface thereof with the second opposite-side fitting groove 322a-1 having the same shape as that of the second heat pipe 321. Accordingly, the second heat pipe 321 is inserted into the through hole 111 in the state that the second heat pipe 321 is coupled to the second fixing member 322, such that the second heat pipe 321 is more simply coupled. In particular, as the second connection part 321b, which is positioned at the opposite side of the opposite surface of the stator core 100, and the second heat part 321a are fitted into the second opposite-side fitting groove 322a-1, the second fixing member 322 has a face-to-face close contact with the opposite surface of the stator core 100, thereby preventing a foreign matter from being introduced between the second fixing member 322 and the stator core 100.

Meanwhile, the second outer fixing part 322a is formed in the opposite side of the opposite surface thereof with a second through hole 322a-2, such that the second discharge part 321c passes through the second through hole 322a-2, thereby rapidly discharging the heat of the second heat pipe 321 to the outside.

As described above, the second fixing member 322 may stably fix the second heat pipe 321 coupled to the opposite surface of the stator core 100.

Meanwhile, a first opposite-side fitting groove 312a-3 is formed in the opposite side of the opposite surface of the first outer fixing part 312a of the first fixing member 312, such that an end portion of the second heat part 321a passing through the through hole 111 is fitted into and coupled to the first opposite-side fitting groove 312a-3, and a second one-side fitting groove 322a-3 is formed in one side of one surface of the second outer fixing part 322a of the second fixing member 322 such that an end portion of the first heat part 311a passing through the through hole 111 is fitted into and coupled to the second one-side fitting groove 322a-3. In other words, the first heat radiating member 310 and the second heat radiating member 320 are coupled to each other while increasing the coupling force.

Therefore, according to the first embodiment of the present disclosure, the stator assembly 10 has a feature of including the heat radiating device 300. The plurality of hairpins 200 coupled to the stator core 100 may be effectively cooled due to the feature. In particularly, the hairpins 200 are simultaneously cooled from one surface to an opposite surface thereof, thereby largely increasing the cooling efficiency.

[Hairpin Winding Motor According to Second Embodiment of Present Disclosure]

According to a second embodiment of the present disclosure, a hairpin winding motor has a feature of including a stator assembly 10 according to the first embodiment of the present disclosure.

Figure 12:
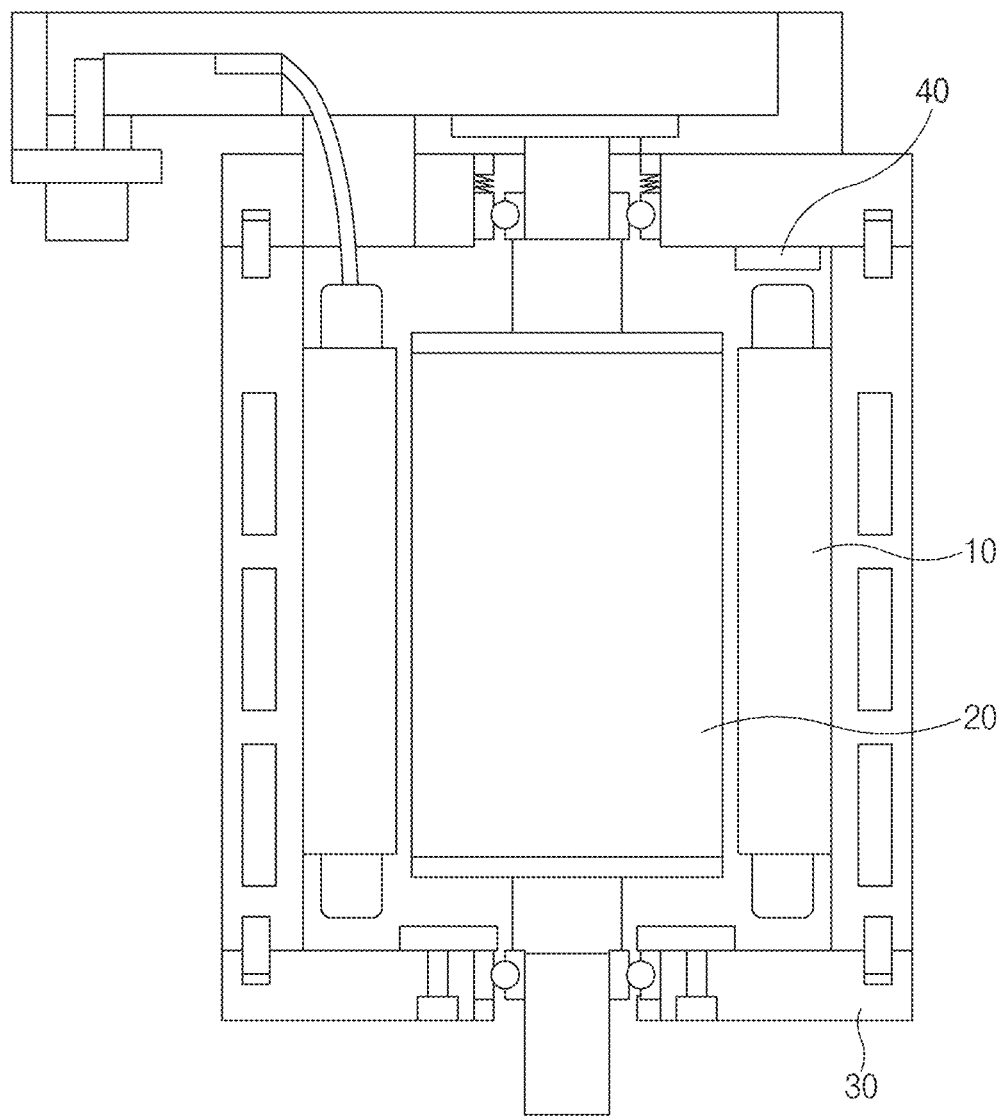
FIG. 12 is a sectional view illustrating a hair winding motor, according to a second embodiment of the present disclosure.
Figure 13:
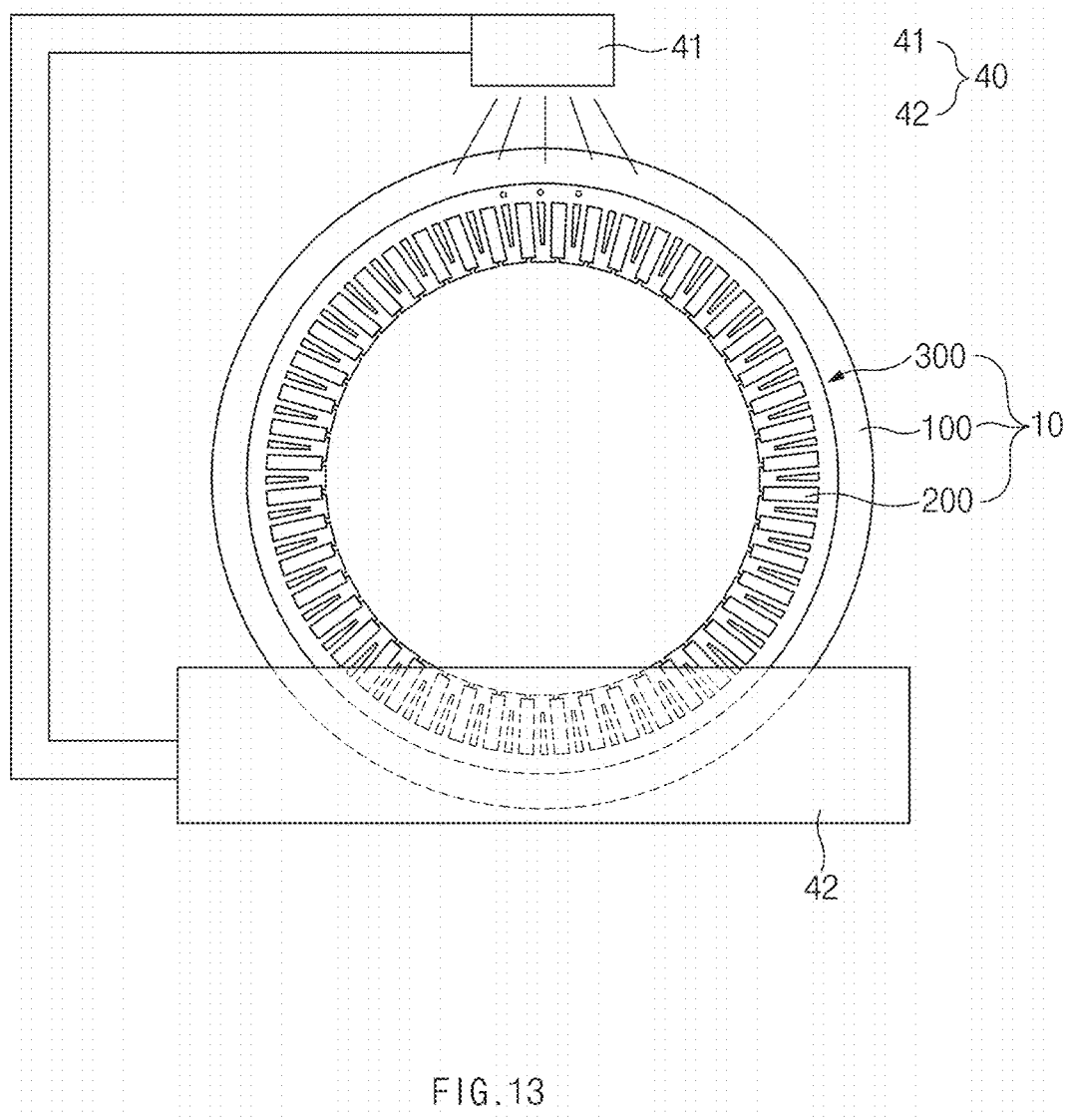
FIG. 13 is a plan view schematically illustrating the operating state of a hair winding motor, according to a second embodiment of the present disclosure.
Figure 14:
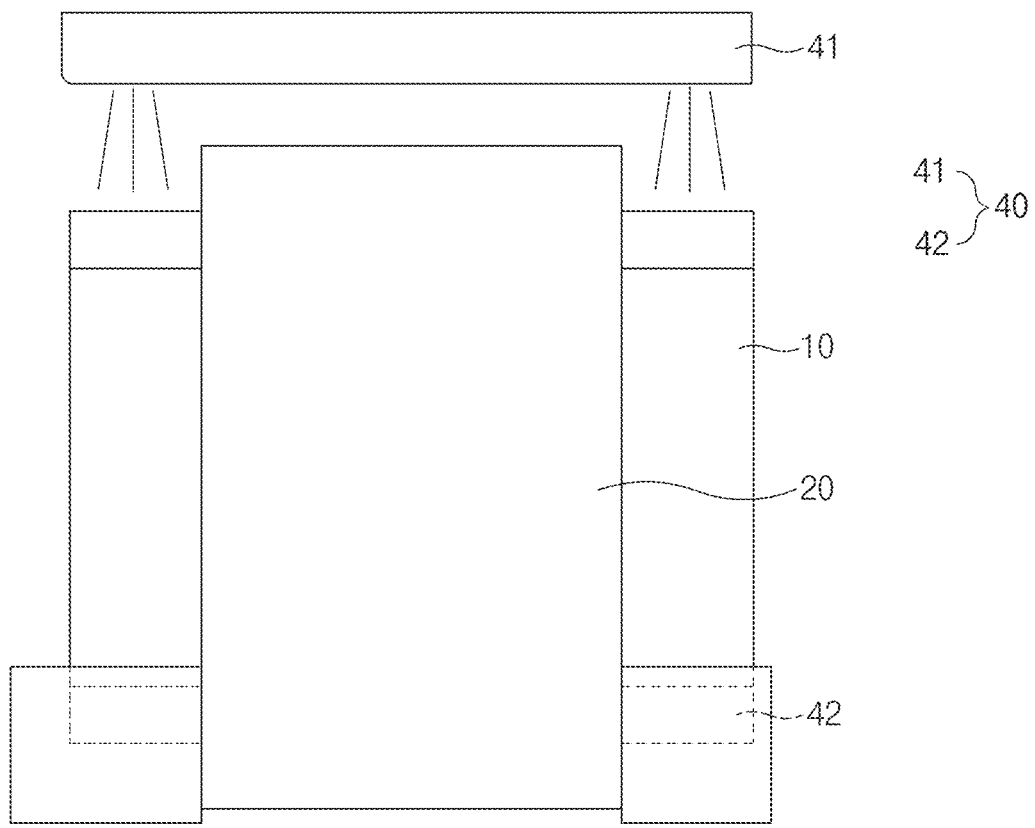
FIG. 14 is a side view schematically illustrating the operating state of a hair winding motor, according to a second embodiment of the present disclosure.

In other words, according to a second embodiment of the present disclosure, the hair winding motor includes a stator assembly 10, a rotor 20 inserted into the stator assembly 10, a housing 30 to receive the stator assembly 10 into which the rotor 20 is inserted, and a spraying device 40 including a spraying part to cool the stator assembly 10 by spraying oil toward the first heat radiating member 310 included in the heat radiating device 300 of the stator assembly 10 and a supply part 42 to recover oil deposited on the bottom surface of the housing 30 and to supply the oil to the spraying part 41, as illustrated in FIGS. 12 to 14.

In this case, the stator assembly 10 has the same configuration as that of the stator assembly according to the first embodiment described above, so the duplicated details thereof will be omitted.

In this case, the spraying device 40 cools the stator assembly while cooling the hairpin 200 provided in the stator assembly from one side to an opposite side of the hairpin 200, as the oil flows from one side to an opposite side of the through hole 111 formed in the stator core 100 along the first heat part or the second heat part of the stator assembly 10.

In particular, the spraying device 40 may effectively cool the first heat radiating member 310 by directly spraying the oil toward the first heat radiating member 310 provided in the stator assembly 10, thereby effectively cooling the hairpin 200.

In addition, in the hair winding motor, the heat pipe should have a cooling part, that is, a heat exchanging part. Accordingly, the heat pipe having a vertical symmetrical structure includes a first heat pipe, which is provided at one side and has a protrusion part (heat exchanging part), that is, a first heat radiation part, formed at a part to which a cooling oil is sprayed, and a second heat part, which is assembled at the lower portion thereof and has a protrusion part (heat exchanging part), that is, a second heat radiation part, formed at an oil deposition part, thereby accomplishing cooling.

Therefore, according to the second embodiment of the present disclosure, the hair winding motor may effectively cool the hairpin by including the stator assembly 10 including the heat radiating device 300. Accordingly, the power and the efficiency may be significantly improved.

As described above, according the present disclosure, the stator assembly has a feature of including the heat radiating device including the first heat radiating member and the second heat radiating member. The heat may be efficiently radiated from the hairpin due to such a feature. Accordingly, the power and the efficiency may be largely improved.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:
1. A stator assembly comprising:
   a stator core including teeth, which are formed along an inner circumferential surface of the stator core, extend from one surface of the stator core to an opposite surface of the stator core, and have through holes formed through one surfaces of the teeth, respectively;
   a plurality of hairpins, each hairpin coupled to and connected with a slot formed between the teeth and configured to form a coil winding; and
   a heat radiating device including a first heat radiating member provided at one side of the one surface of the stator core and configured to discharge heat of the hairpin to an outside, such that the hairpin is cooled, wherein the first heat radiating member includes:

a first heat pipe configured to discharge the heat of the hairpin, which is provided in the stator core, to the outside such that the hairpin is cooled, and provided at the one side of the one surface of the stator core; and a first fixing member configured to fix the first heat pipe to the stator core, wherein the first heat pipe includes:

a plurality of first heat parts inserted into the through holes of the teeth, which are formed at the one side of the one surface of the stator core, respectively, and configured to absorb the heat of the hairpins coupled to the slots through the teeth;

a first connection part provided at the one side of the one surface of the stator core and configured to connect the plurality of first heat parts, which are inserted into the through holes, with each other and to absorb heat of the first heat parts; and a first discharge part provided at the first connection part and configured to discharge heat of the first connection part to the outside.

2. The stator assembly of claim 1, wherein the first heat part is inserted into the through hole while extending from one surface of the through hole to an opposite surface of the through hole and configured to simultaneously absorb the heat of the hairpin coupled to the slot from one side of the hairpin to an opposite side of the hairpin.

3. The stator assembly of claim 1, wherein the first heat part has an area smaller than an area of the through hole to form an oil inflow space which is formed between the first heat part and an inner wall surface of the through hole.

4. The stator assembly of claim 1, wherein the first fixing member includes:

a first outer fixing part configured to fix the first connection part of the first heat pipe; and a first inner fixing part configured to fix the first heat part of the first heat pipe, and wherein the first inner fixing part is formed to correspond to the tooth formed in the stator core.

5. The stator assembly of claim 4, wherein the first outer fixing part includes:

a first one-side fitting groove formed in one side of an opposite surface of the first outer fixing part such that the first connection part and the first heat part, which are positioned at the one side of the one surface of the stator core, are fixedly inserted into the first one-side fitting groove; and a first through hole formed in one side of one surface of the first outer fixing part such that the first discharge part passes through the first through hole.

6. The stator assembly of claim 5, wherein the first fixing member has a face-to-face close contact with the one surface of the stator core, when the first connection part and the first heat part, which are positioned at the one side of the one surface of the stator core, are fitted into the first one-side fitting groove.

7. The stator assembly of claim 6, wherein the heat radiating device further includes:

a second heat radiating member provided at an opposite side of an opposite surface of the stator core and configured to discharge the heat of the hairpin to the outside, such that the hairpin is cooled, and wherein the second heat radiating member includes:

a second heat pipe configured to discharge the heat of the hairpin, which is provided in the stator core, to the outside such that the hairpin is cooled, and provided at the opposite side of the opposite surface of the stator core; and a second fixing member configured to fix the second heat pipe to the stator core.

8. The stator assembly of claim 7, wherein the second heat pipe includes:

a plurality of second heat parts inserted into through holes of teeth formed in the opposite side of the opposite surface of the stator core, respectively, and configured to absorb the heat of the hairpins coupled to the slots through the teeth;

a second connection part provided at the opposite side of the opposite surface of the stator core and configured to connect the plurality of second heat parts, which are inserted into the through holes, with each other and to absorb heat of the second heat parts; and a second discharge part provided at the second connection part and configured to discharge heat of the second connection part to the outside.

9. The stator assembly of claim 8, wherein the second heat part is inserted into the through hole while extending from the opposite surface of the through hole to the one surface of the through hole and configured to simultaneously absorb the heat of the hairpin coupled to the slot from opposite surface of the hairpin to one surface of the hairpin.

10. The stator assembly of claim 9, wherein the second heat part has an area smaller than an area of the through hole to form an oil inflow space between the second heat part and an inner wall surface of the through hole.

11. The stator assembly of claim 8, wherein the second fixing member includes:

a second outer fixing part configured to fix the second connection part of the second heat pipe; and a second inner fixing part configured to fix the second heat part of the second heat pipe, and wherein the second inner fixing part is formed to correspond to the tooth formed in the stator core.

12. The stator assembly of claim 11, wherein the second outer fixing part of the second fixing member includes:

a second opposite-side fitting groove formed in an opposite side of one surface of the second outer fixing part, such that the second connection part and the second heat part, which are positioned at the opposite side of the opposite surface of the stator core, are fixedly inserted into the second opposite-side fitting groove; and a second through hole formed in an opposite surface of the second outer fixing part, such that the second discharge part passes through the second through hole.

13. The stator assembly of claim 12, wherein a first opposite-side fitting groove is formed in an opposite side of the opposite surface of the first outer fixing part of the first fixing member, such that an end portion of the second heat part passing through the through hole is fitted into and coupled to the first opposite-side fitting groove, and wherein a second one-side fitting groove is formed in one side of the one surface of the second outer fixing part of the second fixing member, such that an end portion of the first heat part passing through the through hole is fitted into and coupled to the second one-side fitting groove.

14. A hairpin winding motor comprising:

a stator assembly according of claim 1;

a rotor inserted into the stator assembly;

a housing configured to receive the stator assembly into which the rotor is inserted; and a spraying device including:
a spraying part to cool the stator assembly by spraying oil toward the first heat radiating member included in the heat radiating device of the stator assembly; and
a supply part to recover oil deposited on a bottom surface of the housing and to supply the oil to the spraying part,
wherein the spraying device cools the stator assembly while simultaneously cooling the hairpin, which is coupled to the slot, from one side of the hairpin to an opposite side of the hairpin, as the oil flows from one surface of the through hole to an opposite surface of the through hole along the first heat part or the second heat part.

* * * * *